No. 769,347. PATENTED SEPT. 6, 1904.
E. W. JENKINS.
KNOT TYING DEVICE FOR GRAIN BINDERS.
APPLICATION FILED AUG. 20, 1902.
NO MODEL. 3 SHEETS—SHEET 1.
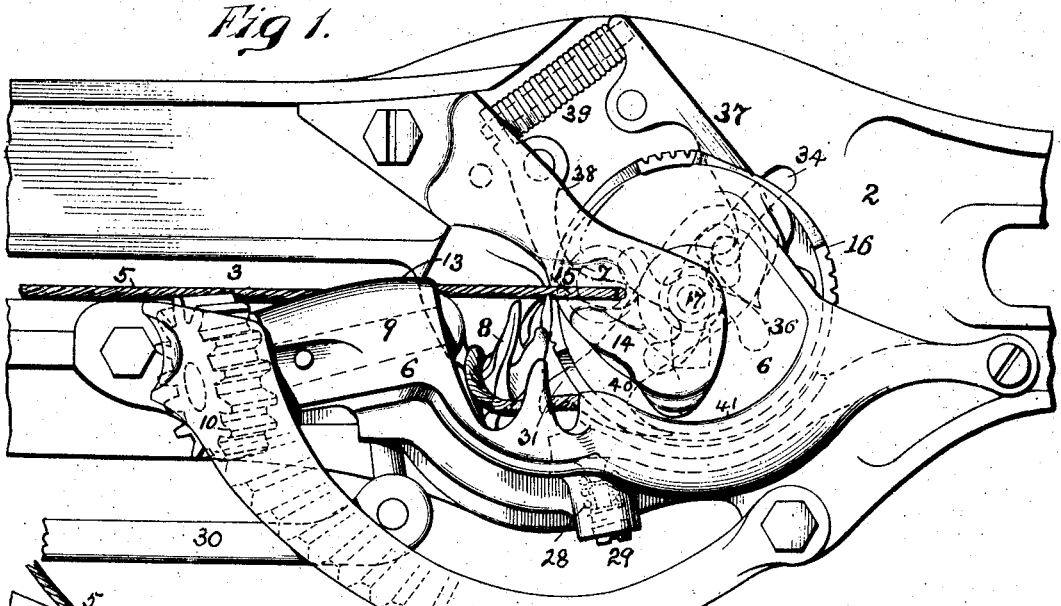
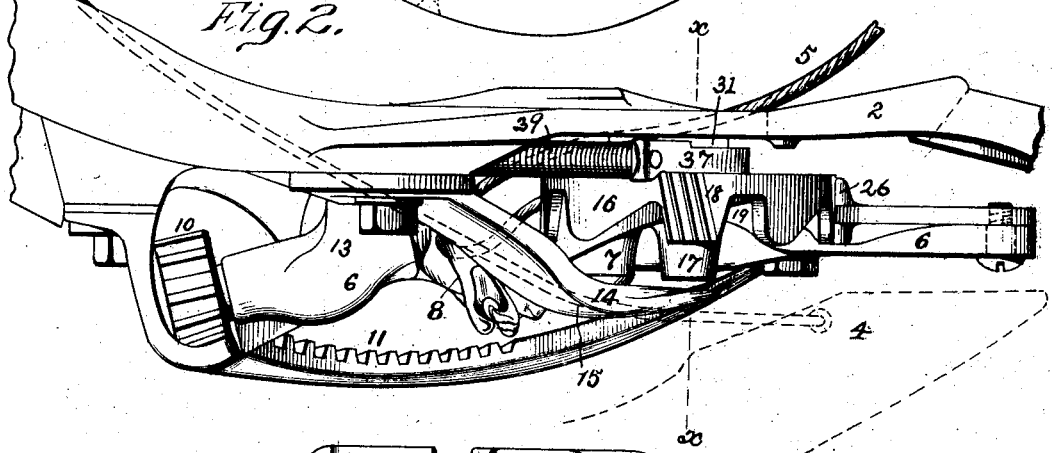
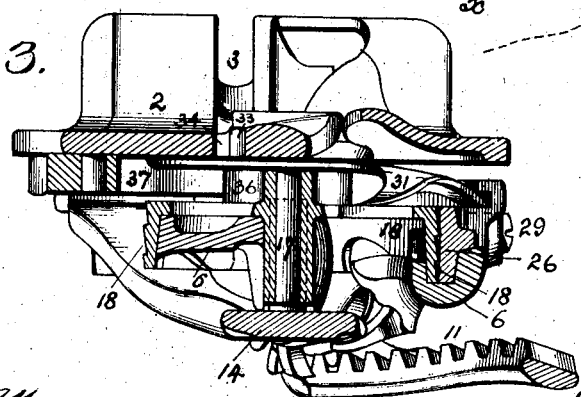
Witnesses:
F. J. Hartman
P. M. Kelly
Inventor:
Edw. Jenkins No. 769,347. PATENTED SEPT. 6, 1904.
E. W. JENKINS.
KNOT TYING DEVICE FOR GRAIN BINDERS.
APPLICATION FILED AUG. 20, 1902.
NO MODEL. 3 SHEETS—SHEET 2.

Fig. 4ª.

Witnesses:
F. J. Hartman
P. M. Kelly

Inventor:
E. W. Jenkins
By his atty

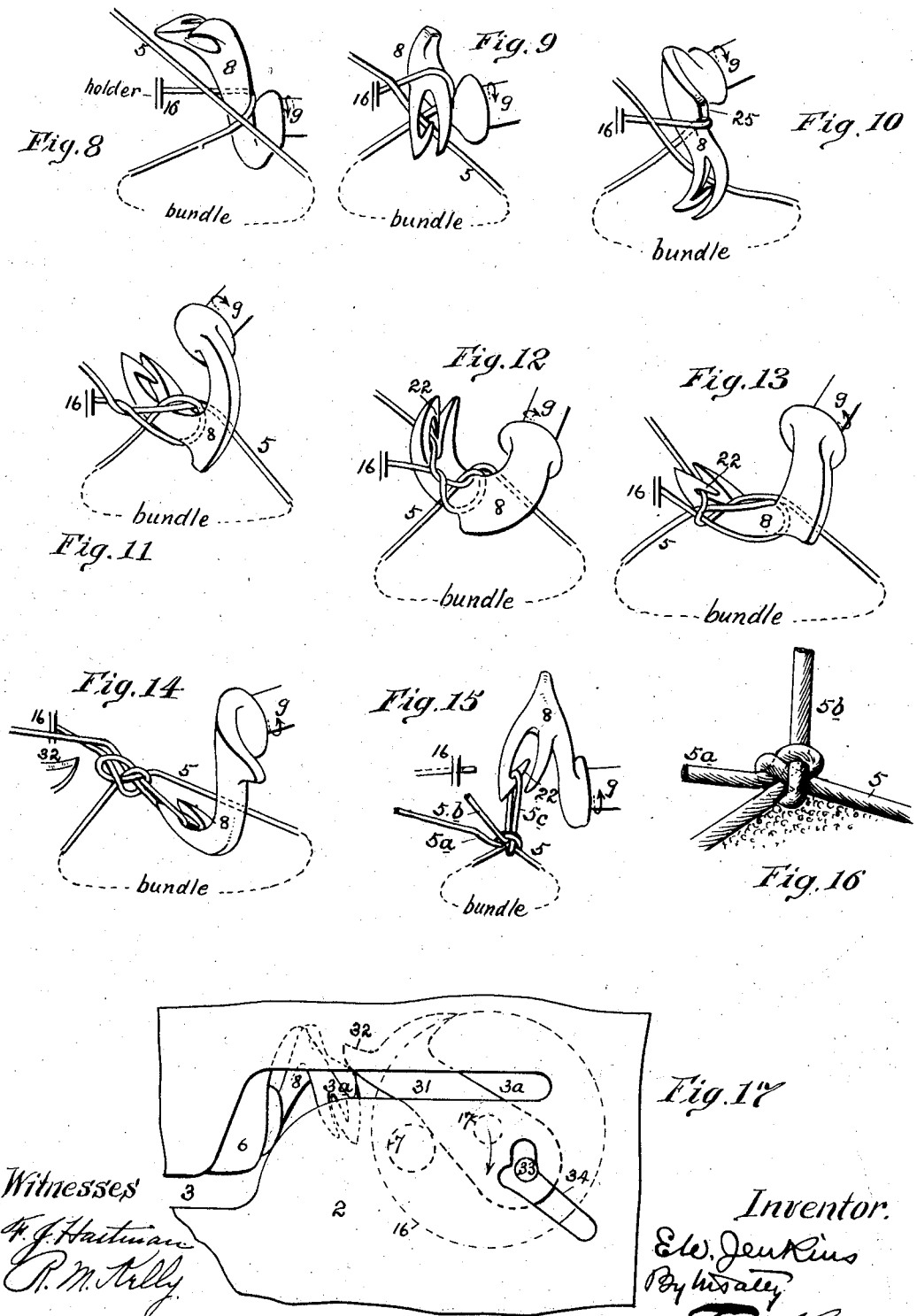

No. 769,347.

Patented September 6, 1904.

UNITED STATES PATENT OFFICE.

EDWARD W. JENKINS, OF NORRISTOWN, PENNSYLVANIA.

KNOT-TYING DEVICE FOR GRAIN-BINDERS.

SPECIFICATION forming part of Letters Patent No. 769,347, dated September 6, 1904.

Application filed August 20, 1902. Serial No. 120,292. (No model.)

*To all whom it may concern:*

Be it known that I, EDWARD W. JENKINS, of Norristown, county of Montgomery, State of Pennsylvania, have invented an Improvement in Knot-Tying Devices for Grain-Binders, of which the following is a specification.

My invention has reference to knot-tying devices for grain-binders; and it consists of certain improvements, which are fully set forth in the following specification and shown in the accompanying drawings, which form a part thereof.

The object of my invention is to provide a simple form of knot-tying device adapted to grain-binders that shall have capacity for tying what may be termed a "weaver's knot" and at the same time form a knot that can be drawn down on the bundle.

My invention comprehends a rotary looper-bill of suitable construction which, in combination with a needle-arm, may be operated to produce what is known as a "weaver's knot," the same consisting in wrapping a loop about a strand and drawing a portion of the strand beyond the loop through the said loop, as more fully described hereinafter. In a knot-tier of this character only one of the ends of the cord passing around the bundle is placed around the looper-bill instead of both ends passing over it, as is customary in knot-tying devices employing rotary bill-loopers heretofore in use.

My invention comprehends many details of construction which, with the above generic features, will be better understood by reference to the drawings, in which—

Figure 4:
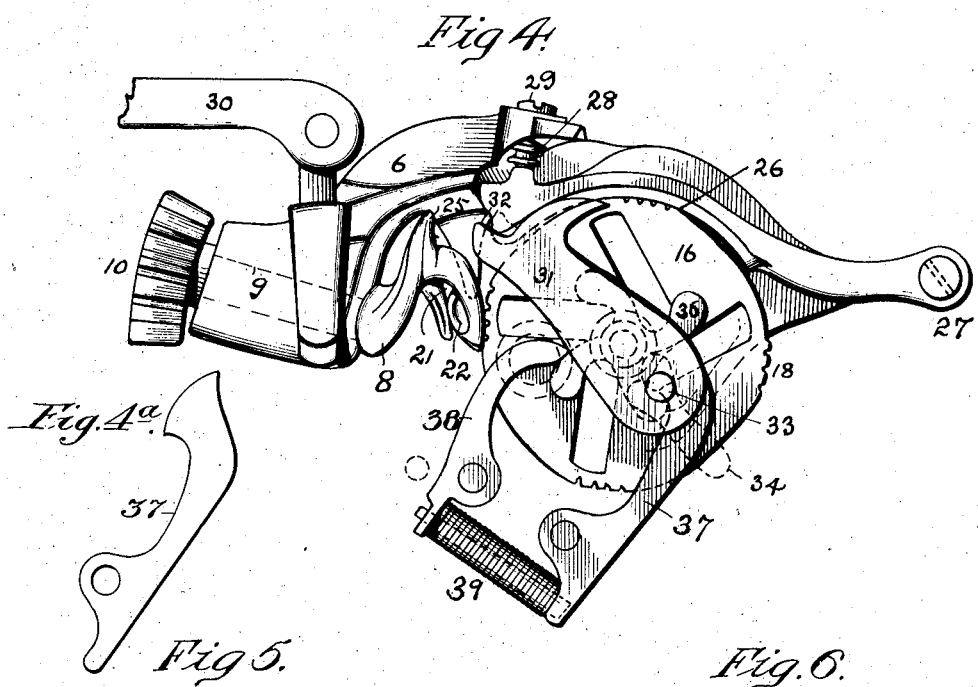
Figure 5:
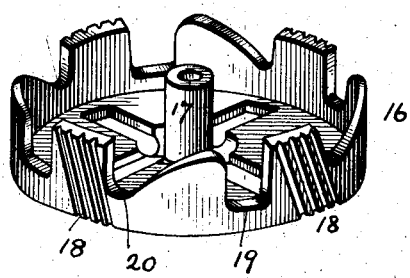
Figure 6:
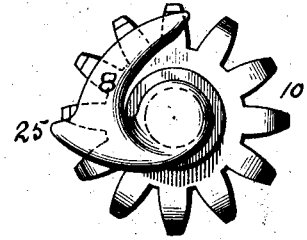
Figure 7:
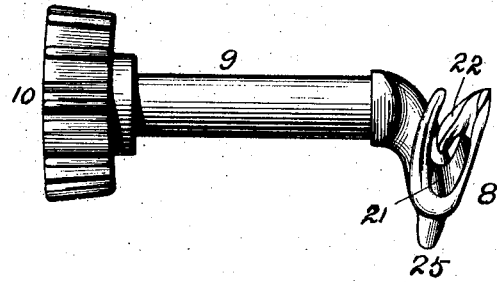

Figure 1 is a bottom plan view of a knot-tier embodying my improvements. Fig. 2 is a side elevation of same. Fig. 3 is a cross-section of same on line $x\,x$ of Fig. 2 looking toward the left. Fig. 4 is a plan view of the looper-bill and rod with the upper framing removed. Fig. 4$^a$ is a plan view of the cord-holder-operating pawl. Fig. 5 is a perspective view of one member of the cord-holder. Fig. 6 is an end view of the looper-bill. Fig. 7 is a side elevation of same. Figs. 8 to 15 are perspective views showing the various movements of the looper-bill in the act of forming the knot. Fig. 16 is an elevation showing the knot on a larger scale; and Fig. 17 is a plan view of a portion of the knot-tier, more particularly illustrating the cutter.

2 is the frame or fixed arm carrying the knot-tier and is provided with the slots 3 and 3$^a$, Figs. 1 and 17, said parts of the slot being displaced laterally, so as to form a part 3$^a$ to cause the cord leading from the cord-holder to wrap about the looper-bill 8, and a part 3 to guide the cord leading from the needle-arm clear of the looper-bill until it is rotated.

4 is the needle-arm and may be of any suitable construction and performs its function of placing the cord around the bundle and delivering its ends to the knot-tier mechanism. As it forms no special part of my invention, I have shown it in dotted lines, Fig. 2.

5 is the cord, which extends from the cord-holder, composed of the parts 16 and 26, thence around the looper-bill, thence upward through slot 3$^a$ and around the bundle, (not shown,) then downward through the slot 3 to one side of the rotary looper-bill 8 to the needle-arm, and through it in the ordinary way to the spool or cord-box.

The looper 8 is made in the form of a spiral hook having a shoulder 25 and its end slotted at 21 to form a jaw, one part of which is provided with a hook or prong 22, the functions of which shoulder and hook or prong being clearly shown in Figs. 9 to 13, inclusive. This looper-bill 8 is provided with a shaft 9, journaled in the frame 6, and carries at its outer end a pinion 10, which meshes with the rack 11, secured to the main frame 2. The frame 6 is journaled upon a vertical stud 7, extending from the frame 14. It is given a rotary reciprocating movement in tying a knot by a power-applying rod 30 or in any other convenient way. When the frame 6 is rotated, the pinion 10 is rotated by being carried over the fixed rack 11, and in this way the rotary looper-bill is given a rotation first in one direction and then a reverse movement. It is also evident that as the frame 6 is oscillated at the same time that the looper-bill is rotated the said looper-bill has its axis of rotation constantly shifting in the act of tying the knot, as will more fully appear farther on. This is important, as it enables the bill of the looper to properly loop and enter between the cords leading to the holder and needle-arm and grasp and withdraw the part thereof next to the needle-arm. The smooth surface 13 of the frame 6 acts as a guide for the cord in passing to the cord-holder.

The frame 6 has journaled upon it eccentrically to the stud 7 an inverted crown-wheel 16, constituting one member of the cord-holder mechanism, the other member being the pivoted clamp 26. The wheel 16 has its bearing close to its periphery, so that there is no tendency to rotate too freely, and has its periphery formed with serrations 18 at intervals separated by two notched portions 19 and 20, as fully shown in Fig. 5. These notched portions are adapted to receive the cord and drag it between the clamp 26 and the crown-wheel itself and so that it lies across the serrations 18, which hold the cord and pull the loop off the knotter, and thereby insures the closing of the loop. The clamp 26 is pivoted to the frame 6 at 27 and is curved to fit snugly against the periphery of the crown-wheel 16, Fig. 4. This clamp is pressed against the crown-wheel by a spring 28, whose tension is adjusted by screw 29. In this manner any degree of nipping and holding pressure may be secured between the parts 16 and 26 to insure the cord-holder performing the function of holding the cord.

The crown-wheel 16 is preferably not a true circle on its periphery, being flattened or cam-shaped between each pair of the parts 18, as shown in Figs. 1 and 4, the function of which is to more readily catch the cord and drag it around into the clamp 26.

At or about the center of the crown-wheel 16 is a hub 17, in which is journaled the shaft of the pivoted knife 31, having the cutting edge 32. The heel of the cutter is provided with a pin 33, which extends upwardly through a slot 34 in the main frame, Figs. 1, 3, and 17. This slot 34 is shaped, as shown, so that when the looper-bill is forming the loop upon itself the cutter will be thrown back away from the bill and when the looper-bill is retracing its movement and completing the knot the cutter will be thrown forward to cut the cord.

The crown-wheel 16 is provided with a four-toothed star-wheel 36, which is acted on by a pivoted spring-controlled pawl 37, which is carried on the main frame 2 and hooks upon the teeth of the star-wheel when the latter is moved in an arc about 7 as a center by the rotary reciprocating movement of the pivoted frame 6, above described. In this manner the crown-wheel 16 is intermittently rotated, so as to bring one of the serrated parts 18 in position in front of the pivoted holder-arm 26, Fig. 4. As this crown-wheel is rotated the cord, which has been laid in the notch 20 by the combined action of the needle-arm and looper-bill, is dragged forward into position between the serrated part 18 of the crown-wheel and the surface of the cord-holder arm 26, where it is firmly held under the action of the spring 28, whose tension may be adjusted by the screw 29, as before stated. A spring-actuated pawl 38, also pivoted to the main frame 2, acts upon the star-wheel to prevent it turning too far when the cord is being pulled by the looper-bill so as to turn the crown-wheel 16 and make it give up cord to form the knot. A spring 39 extends between the heels of the friction-pawl 38 and the actuating-pawl 37, so as to impart to both of them a spring action. Any other spring mechanism may be employed, if so desired.

When the frame 6 is oscillated, the star-wheel is moved toward the pawl 37; but at the same time the action of the looper-bill in taking up the cord in forming the knot causes the crown-wheel 16 of the cord-holding mechanism to rotate at a corresponding speed, and this keeps the pawl 37 in contact with the tooth of the star-wheel. While this action is being performed the star-wheel will be rotating toward the pawl 38 and is stopped only when the end of said pawl is received in the base of the notch between the two teeth. In this way there is no possibility of the crown-wheel 16 being turned to free the cord before the knot is tied, which is a most important feature, as such liberation would destroy the possibility of tying the knot. After the star-wheel has seated itself positively upon the end of the pawl 38 the final movement will cause a tooth of the star-wheel to snap back of the pawl 37. The reverse movement of the frame 6 will cause the axis of the crown-wheel to move away from the pawl 37, and hence its tooth, which is hooked by the end of the pawl 37, will be held while the star-wheel is bodily moved with frame 6 about axis 7, which action will cause the star-wheel to be turned upon its own central axis and snap a tooth of the said star-wheel under the end of the pawl 38 to again bring the crown-wheel and its star-wheel into position to give up cord in the formation of a new knot.

31 is a cutter having the sharp cutting edge 32 and is provided with a pin or stud journaled in bearing 17, as clearly shown in Fig. 3. In this manner the cutter is adapted to move in the arc of a circle having as its axis of rotation the center of the crown-wheel 16. The rear end of the cutter-arm 31 is provided with an upwardly-extending pin 33, which works in a cam-slot 34 in the main frame 2. The object of this pin and slot is to cause the cutter to have a rotary reciprocating motion relative to the cord-holder during the operation of the tying of the knot. Its action is produced by oscillating the frame 6 about 7 as an axis, and thereby swinging the fulcrum-point 17 of the cutter, as indicated by the arrow in Fig. 17. This causes the pin 33 to work in the cam-slot 34 of the stationary main frame 2, and consequently produces an oscillation of the cutter. The oscillation is in the same direction with the oscillation of the cord-holder; but its movement is increased by the action of the pin and slot. For example, if the cord-holder be moved as indicated by the arrow in Fig. 17 the cutter 31 will be caused to swing rapidly from the position indicated into such a position that the cutting edge 32 would approximate the position indicated by the number 16 in this figure. The extent of motion is immaterial beyond the fact that the cutter must have capacity for swinging back out of the way of the slot $3^a$ of the main frame, through which the cord passes to the bundle and needle-arm.

It will be seen that the cord-holding parts 26 and 18 of the cord-holder are greatly to one side of the cord-slot 3 in the frame or breastplate 2 and also that the looper-bill 8 is arranged between said cord-holding parts of the cord-holder and the slot 3, so that the cord extending from the cord-holder is caused to lie substantially diagonal across the looper-bill in reaching the bundle. It will also be observed that the needle-arm 4 causes the cord leading from it to the bundle to lie in alinement with the slot 3, and hence to one side of the looper-bill, so as not to wrap about it when brought in position by the needle-arm.

It is wholly immaterial what position the knot-tier may assume in the grain-binder, as in some classes of machines the bundle is formed above the knot-tier, whereas in other types of machines it is formed below. In Figs. 2 and 3 the position of the knot-tier is as if the bundle were to be formed above the knot-tier; but it is to be understood that this is purely arbitrary and wholly immaterial to the invention forming the subject-matter of this application.

The operation of the machine will be understood and may be described as follows: Assuming that the parts of the machine are in the position indicated in Figs. 1, 2, 3 and 4, the cord 5 will pass from the cord-holder around the neck of the looping-bill 8, thence through the slot $3^a$ and around the bundle, thence through the slot 3 to the needle-arm 4, with the cord resting in a slightly-grooved portion 15 on an extension or bracket 14 of the main frame, which projects below the cord-holder and upon which the stud 7 is formed. When this position is assumed, the cord leading from the needle-arm is practically straight, but the cord leading from the cord-holder extends diagonally around the looper-bill and the parts are as indicated in Figs 1, 2, 3, and 8, the former and latter views being relatively inverted with respect to the other of said views—namely, Figs. 2 and 3. The frame 6 is then oscillated about stud 7 as an axis, (describing an arc from left to right in Fig. 1.) The effect of this is to produce a rotation of the looper-bill, causing it to act upon the cords, as indicated in the several figures from 8 to 12, inclusive. At the same time that this action of the looper-bill is taking place the cord-holder will have been so moved that the spring-pawl 37 will have been kept in hooked position over one of the teeth of the star-wheel 36 while the crown-wheel 16 gives up the cord necessary in forming the knot and the pin 33 of the cutter will have been acted on by the cam-slot 34 so as to throw the cutter 32 to a position farthest away from the looper-bill and avoid interference with the cords—that is, to a position which would correspond to the figure 16 in Fig. 17, for example. A reverse movement of the frame 6 now takes place, and in describing the arc from the right to the left back to its original position the looper-bill 8 is rotated in the reverse direction to its former rotation and successively assumes the position indicated in Figs. 12 to 15, inclusive, and ultimately the position indicated in Figs. 1, 2, 3, and 8, such movement of the looper-bill having completed the knot, as indicated in Figs. 15 and 16. Simultaneously with this reverse action of the looper-bill the cord at the end adjacent to the needle-arm will have been drawn by the looper-bill from the recessed portion 15 of the frame 14 laterally toward the throat 40 between said frame 14 and the frame 6, Fig. 1, and in this manner be permitted to enter the notch 20 of the crown-wheel 16 of the cord-holder, having been guided therein by the inclined edge thereof, Fig. 5, so that it is in position to be dragged into the cord-holder-gripping surfaces upon rotating the crown-wheel. The star-wheel 36 is also during this reverse movement caused to be rotated by being dragged against the spring-pawl 37, which has been hooked upon one of its teeth. When this rotation of the star-wheel and the crown-wheel of the cord-holder takes place, the cord is dragged between the serrated portion 18 of the crown-wheel and the friction-surfaces of the cord-holder arm 26, and all surplus cord between the said cord-holder and looper-bill is thereby taken up. At this time the cords are in the position indicated in Fig. 14—that is, both terminals of the knot are in the cord-holder; but the terminal leading from the cord-holder lies in notch 19 of the crown-wheel, and the terminal leading to the needle-arm lies in notch 20. At this juncture the cam-slot 34, acting upon the pin 33 of the cutter 31, will cause it to rapidly oscillate and bring the cutting edge 32 across the cord last gripped by the cord-holder and sever the cord at a point between the cord-holder and the looper-bill, as indicated at $5^b$ in Fig. 15. This severing of the cord, however, should not, preferably, take place until after the looper-bill has positively drawn up the loop, as indicated in Fig. 14. While this action of the looper-bill is taking place the other end, $5^a$, of the cord is being held in the cord-holder and extends backward toward the looper through the notch 19 of the crown-wheel, so as to give a positive support for one end of the cord while the looper-bill is taking up all the surplus cord possible in the act of tying the knot, and hence causing it to be formed as close to the bundle as possible. When the knot has been completely formed and drawn tight, the cord-holder crown-wheel 16 by rotating under the action of the pawl 37 causes its gripping-surface 18 to move away from the looper-bill and releases the knot end $5^a$ after pulling said end against the action of the looper-bill, but not until the final movement of the looper-bill has drawn the loop $5^c$, Fig. 15, to such extent that the end $5^b$ passes through the knot, this action taking place in such a manner as to draw the knot close to the bundle, with the result that the bundle is tightly tied and all looseness prevented. In all knotters heretofore made with which I am familiar the looper-bill produces slackness in finishing the knot instead of taking up the surplus cord between the knot and the bundle, and I therefore consider this a very important part of my invention. The finished knot, which may be designated as a "weaver's" knot, is shown in Fig. 16 and as far as I am aware has never before been tied by machinery.

The action of the looper-bill on the cord in forming the knot is shown in Figs. 8 to 15, and for convenience these figures are inverted from the positions of the corresponding parts that are shown in Figs. 2 and 3. In Fig. 8 the cord that passes from the cord-holder alone is wrapped around the neck of the looper 8, whereas the other cord end is guided to one side of the looper-bill and assumes a position indicated at 5 in Fig. 1. As the looper-bill is rotated in the direction indicated by the arrow it will be seen that the cord around its neck is twisted into a loop and dragged around by the shoulder 25 on the looper-bill, and at the same time the slotted nose or jaw of the bill is moved over and engages the cord leading to the needle-arm, as indicated in Figs. 9 and 10. A further rotation of the looper-bill causes the jaws of the nose of the bill to approach the cord leading to the needle-arm and receive it in its slot, as indicated in Fig. 12. This having been accomplished, the looper is rotated in the reverse direction, as indicated by the arrows in Figs. 13, 14, and 15. The cord received in the jaw of the looper-bill is caught by the prong 22 therein, as shown in Fig. 13, and is thereby dragged backward through the loop previously formed about the neck of the looper from the cord leading to the cord-holder—namely, the loop formed in the first instance about the looper-bill. This action is indicated in Fig. 14, which shows the loop-shed from the looper-bill so as to be free and between the cord-holder and the bundle and with the cord from the needle-arm hooked onto the prong 22 of the looper-bill in the act of being drawn through the loop of the knot. The cord leading to the needle-arm is at this time clamped in the cord-holder and is cut by the cutter 32 between the knot and the cord-holder. The looper in continuing its movement drags the loop $5^c$ in a direction away from the cord-holder and also away from the bundle, which action induces the knot to work its way up to the bundle, thereby removing all slack from the cord extending around the bundle. The cord leading from the loop $5^c$ is then cut by the cutter 32 between the knot and cord-holder, as indicated in Fig. 15.

In the final movement of the looper-bill when returning to its original position the free end of the loop $5^c$ is pulled through the knot as the bundle is discharged, though this is not essential. The parts are then in position for once more passing the cord around a new bundle and delivering it to the knotter for repeating the operation. In doing this the cord passes from the cord-gripping part 18 of the crown-wheel through notch 20, then backward around the back of part 18 through notch 19, then around the looper to the bundle. The cord then returns and passes into the next notch 20 of the crown-wheel, so that the two ends of the bundle-loop are in different notches 19 and 20.

The shoulder 25 of the looper-bill is very important in that it positively holds the loop out on the periphery of the curve in proper position upon the looper-bill during the act of making the knot—namely, a position which will enable the loop to be shed from the end of the bill after the prong 22 has grasped the cord and started to pull it through the loop. It also draws a proper amount of cord from the holder to tie the knot.

It will be observed that in my improved knot-tying device only one cord is wrapped about the looper-bill in the initial step and that this cord is first looped and wrapped about the other cord end, and through the loop thus formed the distant end of the said other cord leading to the needle-arm is grasped and drawn. Incidental to said operation the two ends—namely, the one leading to the cord-holder and the one leading to the needle-arm—are twisted together, as indicated in Figs. 11 and 12, prior to drawing the end of the cord through the loop in completing the knot, the said twisting operation simply accomplishing the result of enabling the prong to grasp the cord after it has been passed about both ends of the loop portion, as shown more fully in Fig. 13. These features, as far as I am aware, are entirely new in knot-tiers and relate especially to a form of knot such as here shown and which may be termed a "weaver's" knot. It will also be seen that by journaling the looper-bill in the pivoted frame 6 the said bill is given a rotary motion upon its own axis, and an oscillatory motion about another axis 7, transversely arranged in line with its own axis. The result of this is that the bill when performing its rotary reciprocating motion is enabled to assume different positions relatively to the cord ends as defined by the fixed frame and needle-arm, so that the looper-bill nose is enabled to pass by the cord leading to the cord-holder and grasp the cord leading to the needle-arm during the latter part of the formation of the knot, all of which is important in producing a practical construction of apparatus.

While I have shown the apparatus as I have practically constructed it for use and which I have found most excellently adapted to commercial purposes, I do not limit myself to the details or to the special relative movements of the parts, as my invention is intended, broadly, to include a rotary reciprocating looper device combined in any suitable manner with the necessary additional mechanism, including the cord holder and cutter, whereby it will accomplish the tying of the cord to produce the knot herein shown and what may be termed a "weaver's" knot. Therefore, while I prefer the construction shown, I do not confine myself to the details, as they may be varied as found most convenient for any special application of my invention.

Having now described my invention, what I claim as new, and desire to secure by Letters Patent, is—

1. In a knot-tier, a looper-bill having a spirally-shaped body portion extending around its axis of rotation and terminating in a slotted end or jaw one part of which is provided with a rearwardly-extending prong shielded within the jaw and said body also having a shoulder or abutment extending abruptly from the rear of the slotted end and arranged at a distance from the neck formed by the bill and its shaft and in which the shoulder or abutment is caused to travel in the rear of the jaw of the bill whereby the shoulder of the bill supports a looped cord and wraps it about another cord and the bill-jaw grasps the last-mentioned cord alone.

2. In a knot-tier, a looper-bill having a body portion terminating in a slotted end or jaw one part of which is provided with a rearwardly-extending prong shielded within the jaw and also having a shoulder or abutment arranged upon the body of the bill between the jaw and its axis of rotation, in combination with means to impart a rotary motion to the bill first in one direction and then in the other, means including a cord-holder for holding one end of the cord so that it shall extend from said cord-holder around the body of the bill, a needle-arm located to one side of and clear of the bill in its position of rest for guiding the cord extending to the needle-arm from the bundle to one side of the looper-bill whereby the cord leading from the cord-holder is alone looped about the looper-bill in the initial operation.

3. In a knot-tier, a looper-bill having a body portion terminating in a slotted end or jaw one part of which is provided with a rearwardly-extending prong shielded within the jaw, in combination with means to impart a rotary motion to the bill first in one direction and then in the other, means including a cord-holder for holding one end of the cord so that it extends from said cord-holder around the body of the bill, a needle-arm located to one side and clear of the bill in its position of rest for guiding the cord extending to the needle-arm from the bundle to one side of the looper-bill whereby the cord portion leading from the cord-holder is alone looped about the bill, a cutter to sever the cord extending to the needle-arm after it has been grasped by the cord-holder, and means for operating the cutter and cord-holder in succession whereby the cord is grasped by the cord-holder and then severed between the cord-holder and looper-bill.

4. In a knot-tier, the combination of a looper-bill having a curved neck, a slotted nose to form a jaw and an inwardly-directed prong shielded by the side walls of the jaw, with means to rotate said bill first in one direction and then in the other, and means including a cord-holder for conveying and guiding the cord from the cord-holder around the neck of the looper-bill and bundle and back to the cord-holder to one side of and clear of the nose of the looper-bill in its position of rest whereby only one cord end is initially around the bill and the other end is in position to be grasped by the prong in the jaw of the bill.

5. In a knot-tier, the combination of a looper-bill having a slotted nose to form a jaw and an inwardly-directed prong shielded by the side walls of the jaw, with means to rotate said bill first in one direction and then in the other, means including a cord-holder for conveying and guiding the cord from the cord-holder around the looper-bill and bundle and back to the cord-holder to one side of the nose and clear of the looper-bill in its position of rest whereby only one cord end is initially around the bill and the other end is in position to be grasped by the nose of the bill, and mechanism to bodily shift the looper-bill to change its axis of rotation relatively to the means for conveying and guiding the cord whereby the jaw of the bill may be made to receive the cord of its rearwardly-extending prong.

6. In a knot-tier, the combination of a looper-bill having a slotted nose to form a jaw and an inwardly-directed prong shielded by the walls of the jaw, with means to rotate said bill first in one direction and then in the other, means including a cord-holder for conveying and guiding the cord from the cord-holder around the looper-bill and bundle and back to the cord-holder to one side of the nose and clear of the looper-bill in its position of rest whereby only one cord end is initially around the bill and the other end is in position to be grasped by the nose of the bill, mechanism to bodily shift the looper-bill to change its axis of rotation relatively to the means for conveying and guiding the cord whereby the jaw of the bill may be made to receive the cord back of the rearwardly-extending prong, and a cutter to sever the cord close to the bill after it has formed the knot.

7. In a knot-tier, the combination of a looper-bill having a slotted nose to form a jaw and an inwardly-directed prong shielded by the walls of the jaw, with means to rotate said bill first in one direction and then in the other, means including a cord-holder for conveying and guiding the cord from the cord-holder around the looper-bill and bundle and back to the cord-holder to one side of the nose and clear of the looper-bill in its position of rest whereby only one cord is initially around the bill and the other end is in position to be grasped by the nose of the bill, mechanism to bodily shift the looper-bill to change its axis of rotation relatively to the means for conveying and guiding the cord whereby the jaw of the bill may be made to receive the cord back of the rearwardly-extending prong, means to operate the cord-holder to grasp the cord end which is to be received by the nose of the looper-bill and release the other end of the cord previously held, and a cutter to sever the cord between the nose of the looper-bill and cord-holder.

8. In a knot-tier, the main frame having a slot for guiding the cord, a pivoted looper-carrying frame adapted to have a rotary reciprocating motion, a rotary reciprocating looper-bill journaled in the looper-carrying frame, a cord-holder also carried upon the looper-carrying frame whereby the looper-bill and cord-holder always maintain the same relative positions, means for imparting rotary reciprocating movements both to the looper-bill and the pivoted looper-carrying frame and its cord-holder, and means arranged in the path of the cord-holder for giving to it an additional movement to successively grasp and release the cord.

9. In a knot-tier, the main frame having a slot for guiding the cord, a pivoted looper-carrying frame adapted to have a rotary reciprocating motion, a rotary reciprocating looper-bill journaled in the looper-carrying frame, a cord-holder also carried upon the looper-carrying frame whereby the looper-bill and cord-holder always maintain the same relative positions, means for adjusting the gripping action of the cord-holder, means for imparting rotary reciprocating movements both to the looper-bill and the pivoted looper-carrying frame and its cord-holder, a movable cutter for cutting the cord close to the holder and carried with the pivoted looper-carrying frame, means connecting the cutter with the main frame for imparting to it a movement in addition to the movements imparted by the looper-carrying frame, and means arranged in the path of the cord-holder for giving to it an additional movement to successively grasp and release the cord.

10. In a knot-tier the combination of a looper-bill with means to move said bill first in one direction and then in the other to produce a loop and form the knot, and means including a cord-holder for conveying and guiding the cord from the cord-holder around the looper-bill and bundle and back close to the cord-holder but to one side and clear of the looper-bill when in position of rest whereby only one cord end is initially around the bill and the other end is in position to be drawn through the loop formed by the bill.

11. In a knot-tier the combination of a looper-bill, with means to move said bill first in one direction and then in the other to produce a loop to form the knot, means including a cord-holder for conveying and guiding the cord from the cord-holder around the looper-bill and bundle and back close to the cord-holder but to one side and clear of the looper-bill when in position of rest whereby only one cord end is initially around the bill and the other end is in position to be drawn through the loop formed by the bill, and mechanism to bodily shift the looper-bill to change its axis of rotation relatively to the means for conveying and guiding the cord whereby the loop on the bill may be brought to the proper position for drawing the cord end not in the cord-holder through said loop.

12. In a knot-tier the combination of a looper-bill, with means to move said bill first in one direction and then in the other to produce a loop to form the knot, means including a cord-holder for conveying and guiding the cord from the cord-holder around the looper-bill and bundle and back close to the cord-holder but to one side and clear of the looper-bill when in position of rest whereby only one cord end is initially around the bill and the other end is in position to be drawn through the loop formed by the bill, mechanism to bodily shift the looper-bill to change its axis of rotation relatively to the means for conveying and guiding the cord whereby the loop on the bill may be brought to the proper position for drawing the cord end not in the cord-holder through said loop, and a cutter to sever the cord close to the bill after it has formed the knot.

13. In a knot-tier the combination of a looper-bill, with means to move said bill first in one direction and then in the other to produce a loop to form the knot, means including a cord-holder for conveying and guiding the cord from the cord-holder around the looper-bill and bundle and back close to the cord-holder but to one side and clear of the looper-bill when in position of rest whereby only one cord end is initially around the bill and the other end is in position to be drawn through the loop formed by the bill, mechanism to bodily shift the looper-bill to change its axis of rotation relatively to the means for conveying and guiding the cord whereby the loop on the bill may be brought to the proper position for drawing the cord end not in the cord-holder through said loop, means to operate the cord-holder to grasp the cord end which is to be drawn through the loop formed by the looper-bill and release the other end of the cord previously held, and a cutter to sever the cord between the nose of the looper-bill and cord-holder.

14. In a knot-tier, the main frame having a slot for guiding the cord, a pivoted looper-carrying frame adapted to have a rotary reciprocating motion, a rotary reciprocating looper-bill journaled in the looper-carrying frame, a cord-holder having a rotating wheel for holding the cord also carried upon the looper-carrying frame whereby the looper-bill and cord-holder always maintain the same relative positions, means for imparting a rotary reciprocating movement both to the looper-bill and the pivoted looper-carrying frame and its cord-holder, and means having a stationary support arranged in the path of the cord-holder for giving to it an independent movement to successively grasp and release the cord and also to permit the cord-holder wheel to rotate toward the looper-bill to give cord to make the loop and yet hold said wheel against rotation sufficient to release the cord while the knot is being formed.

15. In a knot-tier, the combination of a cord-holder, a frame having two guiding parts one 3ª for the cord leading from the cord-holder to one side of the bundle and the other 3 for the cord leading from the needle-arm to the other side of the bundle, a needle-arm, and a looper arranged between the first-mentioned cord-guiding part 3ª and cord-holder so as to receive the cord extending between these parts, said looper being located when in its position of rest substantially out of line of the other guiding part 3 and clear of the cord extending between the needle-arm and the said guiding part 3, whereby the looper is adapted to loop one of the cords about the other.

16. A knot-tying device consisting of a needle-arm, a cord-holder for retaining the cut end of the cord, in combination with a looper, slotted guides 3ª and 3 between said holder and axis of the needle-arm to guide the outgoing cord from said holder around said looper and the incoming cord in position to one side of the looper and so as to be grasped by the looper in its forward motion.

17. A knot-tying device consisting of a needle-arm, a cord-holder for retaining the cut end of the cord, in combination with a looper, slotted guides 3ª and 3 between said holder and axis of the needle-arm to guide the outgoing cord from said holder around said looper and the incoming cord in front of said looper in position to one side of the looper and so as to be grasped by the looper in its forward motion, means to rotate the looper to make the knot, and means to operate the cord-holder to give part of its cord to its looper during the formation of the knot.

18. A knot-tying device consisting of a needle-arm to place the incoming cord in the cord-holder, a cord-holder for retaining the cut end of the cord, in combination with a looper, slotted guides 3ª and 3 between said holder and axis of the needle-arm to guide the outgoing cord from said holder around said looper and the incoming cord in front of said looper in position to one side of the looper and so as to be grasped by the looper in its forward motion, means to operate the looper to form the knot, and means to operate the cord-holder to grasp the incoming cord and release the end of the cord it originally held.

19. A knot-tying device consisting of a needle-arm to place the incoming cord in the cord-holder, a cord-holder for retaining the cut end of the cord, in combination with a looper, slotted guides 3ª and 3 between said holder and axis of the needle-arm to guide the outgoing cord from said holder around said looper and the incoming cord in front of said looper in position to one side of the looper and so as to be grasped by the looper in its forward motion, means to operate the looper to form the knot, means to operate the cord-holder to grasp the incoming cord and release the end of the cord it originally held, and a cutter to cut the incoming cord between the looper and the cord-holder after it has been grasped by the cord-holder.

20. In a knot-tier the combination of a cord-holder, a looper-bill having a jaw in its end, means including a needle-arm for initially guiding the cord from the cord-holder once around the looper-bill thence around the bundle and then to the needle-arm and supporting its part next to the needle-arm to one side of the looper-bill, and means for operating the looper-bill to cause its end to pass about the portion of the cord leading from the cord-holder to the bundle and also about that portion of the cord leading from the needle-arm to the bundle and to grasp the portion of the cord next to the needle-arm and between the needle-arm and looper-bill.

21. In a knot-tier the combination of a cord-holder, a looper-bill having a jaw in its end, means including a needle-arm for initially guiding the cord from the cord-holder once around the looper-bill thence around the bundle and then to the needle-arm in free condition to one side of the looper-bill, means for operating the looper-bill to cause its end to pass about the portion of the cord leading from the cord-holder to the bundle and also about that portion of the cord leading from the needle-arm to the bundle and to grasp the portion of the cord next to the needle-arm and between the needle-arm and looper-bill, and means to operate the cord-holder to gradually withdraw the cord held by it as the looper-bill completes the knot.

22. In a knot-tier, the combination of a cord-holder, a needle-arm, guiding means for the cord to one side of the cord-holder between the bundle and cord-holder, and means coöperating with the aforesaid parts for looping the cord next to the end grasped in the cord-holder and wrapping the loop about the cord end leading to the needle-arm and withdrawing the part of the cord end leading to the needle-arm through the loop to form a knot.

23. In a knot-tier, the combination of a cord-holder, a needle-arm, guiding means for the cord to one side of the cord-holder between the bundle and cord-holder, means coöperating with the aforesaid parts for looping the cord next to the end in the cord-holder and wrapping the loop about the cord end leading to the needle-arm and drawing the part of the cord end leading to the needle-arm through the loop to form a knot, means for causing the cord-holder to grasp the cord leading to the needle-arm and a cutter to sever the cord leading to the needle-arm at a point beyond the knot and between the looper and cord-holder.

24. In a knot-tier, a looper-bill, in combination with mechanism for wrapping a cord once around the looper-bill to form a loop, and means for operating the looper-bill to wrap said loop around another portion of the cord and draw the free end thereof through the loop.

25. In a knot-tier the combination of a looper-bill, a needle-arm, and a slotted guide 3 to hold the cord wholly to one side of the looper-bill.

26. In a knot-tier the combination of a looper-bill, a needle-arm, and a slotted guide having a portion 3 arranged to one side of the looper-bill whereby it is adapted to hold one portion of the cord wholly to one side of the looper-bill and a portion $3^a$ over the looper-bill whereby another portion of the cord is wrapped around the looper-bill.

27. In a knot-tier, a cord-holder consisting of a crown-wheel 16 having serrations 18 and notches 20, and a star-wheel 36, combined with a hinged clamping-arm 26 spring-pressed against the crown-wheel, a hook-shaped spring-pawl 37 pressing in contact with the star-wheel whereby it is alternately rotated and held against rotation, a movable frame supporting the crown-wheel and star-wheel of the cord-holder, and means for reciprocating said frame for moving the star-wheel relatively to the pawl.

28. In a knot-tier a cord-holder consisting of a crown-wheel 16 having serrations 18, notches 20 and a star-wheel 36, a hinged clamping-arm 26 spring-pressed against the crown-wheel, a spring-pawl 37 to rotate the star-wheel and also to hold it against rotation, a spring-pawl 38 to limit the possible rotation of the star-wheel and its crown-wheel, and means for imparting a relative reciprocatory motion between the cord-holder and the spring-pawl.

29. In a knot-tier for a grain-binder, the combination of a cord-holding device, a needle-arm for passing the cord around the bundle, a looper for operating upon the cords between the cord-holder and bundle, and means for moving the gripping part of the cord-holding device away from the looper when completing the knot, whereby the end $5^a$ of the cord in the holder is drawn or pulled in a direction away from the looper and end $5^b$ is drawn out of the loop and the knot crowded toward the bundle.

30. In a knot-tier for a grain-binder, the combination of a cord-holding device, a needle-arm for passing the cord around the bundle, a looper for operating upon the cords between the cord-holder and bundle, means for rotating the looper and causing it to carry the loops of the knot away from the cord-holder, and means for moving the gripping part of the cord-holding device in a direction away from the looper when completing the knot, whereby the end $5^a$ of the cord in the holder is drawn or pulled away from the looper and end $5^b$ is drawn out of the loop and the knot crowded toward the bundle.

31. In a knot-tier, the combination of a frame against which the bundle rests having a slot for the cord, a cord-holder having its cord-grasping portion arranged to one side of said cord-slot, a looper-bill arranged between the cord-grasping portion of the cord-holder and the cord-slot, whereby the cord leading from the cord-holder is required to lie in a diagonal direction across the looper-bill, and a needle-arm having its point adapted to guide the cord leading from it to the bundle in substantial alinement with the cord-slot so that said cord is supported to one side of the looper-bill.

32. In a grain-binder, the combination of a cord-holder, an arm to pass the cord from the cord-holder around the bundle and bring the other end back close to the holder, and means including a looper for forming a loop of the cord connected with and adjacent to the cord-holder and wrapping it about the cord connected with and adjacent to the arm and finally draw said last-mentioned cord portion through the loop to form the knot.

33. In a grain-binder, the combination of a cord-holder, a needle-arm, a rotary reciprocating looper-bill having a hooked jaw, and means to rotate the looper-bill to move its hooked jaw away from the holder at time of completing the knot whereby the knot is closed close to the bundle.

In testimony of which invention I have hereunto set my hand.

E. W. JENKINS.

Witnesses:
R. M. HUNTER,
R. M. KELLY.